US012181129B1

(12) United States Patent
Wang et al.

(10) Patent No.: US 12,181,129 B1
(45) Date of Patent: Dec. 31, 2024

(54) STARRY SKY AURORA ATMOSPHERE LAMP WITH INTEGRATED LAMPSHADE

(71) Applicant: Shenzhen Wanbo Technology Co., Ltd., Guangdong (CN)

(72) Inventors: Huanlong Wang, Guangdong (CN); Mingfang Sun, Guangdong (CN); Zhihui Huang, Guangdong (CN)

(73) Assignee: Shenzhen Wanbo Technology Co., Ltd., Guangdong (CN)

( * ) Notice: Subject to any disclaimer, the term of this patent is extended or adjusted under 35 U.S.C. 154(b) by 0 days.

(21) Appl. No.: 18/783,648

(22) Filed: Jul. 25, 2024

(30) Foreign Application Priority Data

Feb. 2, 2024 (CN) ......................... 202410147130.1

(51) Int. Cl.

| | |
|---|---|
| ***F21V 14/08*** | (2006.01) |
| ***F21S 10/00*** | (2006.01) |
| ***F21V 7/00*** | (2006.01) |
| ***F21V 17/10*** | (2006.01) |
| ***F21V 23/04*** | (2006.01) |
| *F21W 121/00* | (2006.01) |
| *F21Y 113/00* | (2016.01) |

(52) U.S. Cl.
CPC ............ *F21V 14/08* (2013.01); *F21S 10/007* (2013.01); *F21V 7/0033* (2013.01); *F21V 17/107* (2013.01); *F21V 23/04* (2013.01); *F21W 2121/008* (2013.01); *F21Y 2113/00* (2013.01)

(58) Field of Classification Search
CPC ...... F21V 14/08; F21V 14/085; F21V 17/107; F21S 8/035; F21S 10/007
See application file for complete search history.

(56) References Cited

U.S. PATENT DOCUMENTS 11,859,794 B1 * 1/2024 Lin ........................ F21V 23/003
2015/0260387 A1 * 9/2015 Gamble .................. F21S 8/035 362/157
2022/0243895 A1 * 8/2022 Xu ............................ F21V 7/10

FOREIGN PATENT DOCUMENTS

CN 219976204 U 11/2023

* cited by examiner

*Primary Examiner* — Sean P Gramling
(74) *Attorney, Agent, or Firm* — Cooper Legal Group, LLC

(57) ABSTRACT

A starry sky aurora atmosphere lamp with an integrated lampshade is provided, including a base, a main light source, a multi-layer housing, and a connector. The main light source is arranged at a center of the base and can project light upwards to form a starry sky atmosphere light. The multi-layer housing can cover the base, such that the main light source is located within an accommodating space formed between the base and the multi-layer housing. The multi-layer housing includes an inner light-gathering cover and a semi-obscuring outer cover covering a surface of the light-condensing inner cove. The connector connects the base with the multi-layer housing. When the multi-layer housing is rotated to cover the base, the multi-layer housing and the base have integral and continuous appearance, and the starry sky atmosphere light is automatically changed to colored glaze light of a small night lamp.

16 Claims, 12 Drawing Sheets
(2 of 12 Drawing Sheet(s) Filed in Color)

STARRY SKY AURORA ATMOSPHERE LAMP WITH INTEGRATED LAMPSHADE

CROSS-REFERENCE TO RELATED APPLICATION

The present application claims the priority and benefit of Chinese patent application No. 202410147130.1, filed on Feb. 2, 2024. The entirety of Chinese patent application No. 202410147130.1 is hereby incorporated by reference herein and made a part of this specification.

TECHNICAL FIELD

The present application relates to a technical field of light emitting devices, and, in particular, to a starry sky aurora atmosphere lamp with an integrated lampshade.

BACKGROUND ART

Applications of an atmosphere lamp in the market are continuously expanding, covering increasing application scenarios. In some situations, it is desirable to project a light and shadow onto a building through the atmosphere lamp to achieve a lighting effect to beautify the building and create an atmosphere.

For example, Chinese utility model patent CN219976204U discloses a water ripple projection lamp that enhances an use efficiency and a luminous efficiency of the light, improving a projection effect. However, this patent can only achieve single lighting effect, but cannot meet people's needs for different light and shadow decorations and illumination. For example, in low-brightness environment such as at night, even if a person feels glaring by the light and shadow projected by the atmosphere lamp, the projection lamp can not be switched to a low-brightness lighting effect.

SUMMARY

The present application aims to at least solve a technical problem of the lighting effect of the atmosphere lamp is single in existing art, which cannot meet people's needs for different light and shadow decorations and illumination. Therefore, the present application proposes a starry sky aurora atmosphere lamp with an integrated lampshade.

A starry sky aurora atmosphere lamp with an integrated lampshade, including: a base;

- a main light source, arranged at a center of the base and capable of projecting light upwards to form a starry sky atmosphere light;
- a multi-layer housing configured to cover the base, such that the main light source is located within an accommodating space formed between the base and the multi-layer housing, wherein the multi-layer housing includes an inner light-gathering cover and a semi-obscuring outer cover covering a surface of the inner light-gathering cover;
- a connector for connecting the base with the multi-layer housing, when the multi-layer housing is rotated to cover the base, the multi-layer housing and the base have an integral and continuous appearance, and the starry sky atmosphere light automatically transits into a colored glaze of a small night lamp.

By adopting the above technical solution, on one hand, by selecting whether the multi-layer housing covers the base, the starry sky aurora atmosphere lamp with an integrated lampshade can emit a lighting effect with appropriate atmosphere according to changes in usage scenarios and environment. On the other hand, the inner light-gathering cover centers a pattern of the colored glaze of the small night lamp formed on a surface of the semi-obscuring outer cover, thereby improving a viewing angle and aesthetic appeal. The semi-obscuring outer cover reduces an intensity of a transmitted light, making the colored glaze of the small night lamp softer and preventing the light from projecting onto a building, yet still providing decoration and illumination for a surrounding environment.

According to an embodiment of the present application, a first auxiliary light source is further arranged in the base at a first side of the main light source; and the first auxiliary light source is configured to be turned on when the main light source is turned off and turned off when the main light source is turned on.

By adopting the above technical solution, the first auxiliary light source is used for upward projecting out the atmosphere light, which can form the colored glaze of the small night lamp. The first auxiliary light source also can cooperate with the main light source or a second auxiliary light source, to be mentioned later, to form the colored glaze of the small night lamp.

According to an embodiment of the present application, the first auxiliary light source includes a circuit board, a first auxiliary lighting element arranged on the circuit board, and a switch for controlling the first auxiliary lighting element to be turned on or turned off; and the connector is configured to abut against the switch to turn on the switch when the multi-layer housing covers the base, and the connector is configured to move away from the switch to turn off the switch when the multi-layer housing is opened by a maximum angle.

By adopting the above technical solution, the switch can control the first auxiliary lighting element to be turned on or turned off.

When the multi-layer housing is covered on the base, the connector abuts against a sensor end of the switch, which controls the first auxiliary lighting element to be turned on.

The first auxiliary lighting element is used for projecting out the atmosphere light, which can form the colored glaze of the small night lamp, or the first auxiliary lighting element can project out the atmosphere light in conjunction with the main light source and a second auxiliary light source, to be mentioned later, to form the colored glaze of the small night lamp.

When the multi-layer housing is not covered on the base and is opened by the maximum angle, the connector move away from the sensor end of the switch, which controls the first auxiliary lighting element to be turned off.

In the above embodiment, a state of the multi-layer housing covers the base is determined by whether the connector abuts against the sensor end of the switch, thus enabling the starry sky aurora atmosphere lamp with an integrated lampshade to emit the lighting effect with appropriate atmosphere according to changes in usage scenarios and environment.

According to an embodiment of the present application, a second auxiliary light source is further arranged in the base at a second side of the main light source, and the second auxiliary light source is configured to project a movable point light source or line light source onto the multi-layer housing.

By adopting the above technical solution, the second auxiliary light source can project out the point light source or line light source upwards, and the second auxiliary light source can cooperate with the first auxiliary lighting element and the main light source to form the starry sky atmosphere light or the colored glaze of the small night lamp.

According to an embodiment of the present application, the starry sky aurora atmosphere lamp with an integrated lampshade further includes a drive element configured to at least control the second auxiliary light source to project the movable point light source or line light source onto the multi-layer housing; or the drive element is configured to control the second auxiliary light source to project the movable point light source or line light source onto the multi-layer housing and to control a light output effect of the main light source.

By adopting the above technical solution, the drive element allows the second auxiliary light source to project the movable point light source or line light source onto the multi-layer housing. Compared to projecting a stationary point light source or line light source, the effect of forming the starry sky atmosphere light or the colored glaze of the small night lamp is more diverse.

According to an embodiment of the present application, the starry sky aurora atmosphere lamp with an integrated lampshade further includes a first gear set, dynamically coupled with the drive element and a second gear set meshing with the first gear set; the first gear set is provided with a first shaft, and the second gear set is at least provided with a second shaft; a first light effect adjustment plate is arranged on the first shaft, and a second light effect adjustment plate is arranged on the second shaft; the first light effect adjustment plate is configured for adjusting a light output effect of the main light source, and the second light effect adjustment plate is configured for adjusting a light output effect of the second auxiliary light source.

By adopting the above technical solution, the first light effect adjustment plate is positioned directly above the main light source, and the light emitted by the main light source can present different light-and-shadow patterns after passing through the first light effect adjustment plate.

For example, a wavy groove a can be formed on the first light effect adjustment plate, and the light emitted by the main light source passes through the wavy groove a, presenting a light-and-shadow pattern of Milky Way.

The second light effect adjustment plate is positioned directly above the second auxiliary light source, and the light emitted by the second auxiliary light source can also present different light-and-shadow patterns after passing through the second light effect adjustment plate.

For example, several notches can be formed on the second light effect adjustment plate, and the light emitted by the second auxiliary light source passes through the notches, presenting a light-and-shadow pattern of starry sky.

In addition, in this embodiment, only one drive element is used as a power source for driving the first gear set and the second gear set, which improves a space utilization rate of the base.

According to an embodiment of the present application, the second gear set is at least defined with a third shaft parallel to the second shaft, a third light effect adjustment plate is arranged on the third shaft; the second auxiliary light source includes a light source element, a beam splitter located in a light output direction of the light source element, a reflector arranged parallel to the beam splitter, a first reflective cup arranged corresponding to the beam splitter, and a second reflective cup arranged corresponding to the reflector; and the second light effect adjustment plate corresponds in position to the first reflective cup, and the third light effect adjustment plate corresponds in position to the second reflective cup.

By adopting the above technical solution, the second light effect adjustment plate is positioned directly above the first reflective cup, and the third light effect adjustment piece is positioned directly above the second reflective cup.

When the light emitted by the second auxiliary light source passes through the beam splitter, a portion of the light is directed towards the first reflective cup, which is used to increase an illumination range of this portion of the light and guide it towards the second light effect adjustment plate.

According to an embodiment of the present application, a first end of the connector is rotatably connected to the base, and a second end is fixed to the multi-layer housing; the connector is configured such that, when the multi-layer housing covers the base, the connector is accommodated in the base, and when the multi-layer housing is opened by a maximum angle, one end of the multi-layer housing fixed with the connector is spaced apart from an outer wall of the base.

By adopting the above technical solution, the multi-layer housing is rotatably arranged on the base through the connector, ensuring that the multi-layer housing do not completely separated from the base during use.

Furthermore, when the multi-layer housing is opened by the maximum angle, the connector abuts against the outer wall of the base, so that the multi-layer housing is spaced apart from the outer side wall of the base, which can avoid the multi-layer housing is broken due to direct collision between the multi-layer housing and the base when a force for opening the multi-layer housing 300 is too large.

According to an embodiment of the present application, a material of the connector is plastic and silicone, and/or the connector includes a first connecting section and a second connecting section located between the first end and the second end; the first connecting section and the second connecting section are connected to form a fishhook shape; and a stopper part is arranged on the base, when the multi-layer housing is opened by the maximum angle, the first connecting section can hook the stopper part, and the second connecting section is positioned outside the base.

By adopting the above technical solution, when the multi-layer housing is opened by the maximum angle, the first connecting section can hook the stopper part, which can make a position of the multi-layer housing more stable.

According to an embodiment of the present application, appearance of the starry sky aurora atmosphere lamp with an integrated lampshade is one selected from a group consisting of: cube, cuboid, sphere, truncated cone, truncated pyramid, and ellipsoid; and/or the inner light-gathering cover and the semi-obscuring outer cover are integrally formed with each other; and/or the inner light-gathering cover and the semi-obscuring outer cover are detachably connected with each other.

In summary, the present application includes at least one of the following beneficial technical effects.

On one hand, by selecting whether the multi-layer housing covers the base, the starry sky aurora atmosphere lamp with an integrated lampshade can emit a lighting effect with appropriate atmosphere according to changes in usage scenarios and environment. On the other hand, the inner light-gathering cover centers the pattern of the colored glaze of the small night lamp formed on the surface of the semi-obscuring outer cover, thereby improving the viewing angle and aesthetic appeal. The semi-obscuring outer cover reduces the intensity of the transmitted light, making the colored glaze of the small night lamp softer and preventing the light from projecting onto the building, yet still providing decoration and illumination for the surrounding environment.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

DETAILED DESCRIPTION

Figure 1:
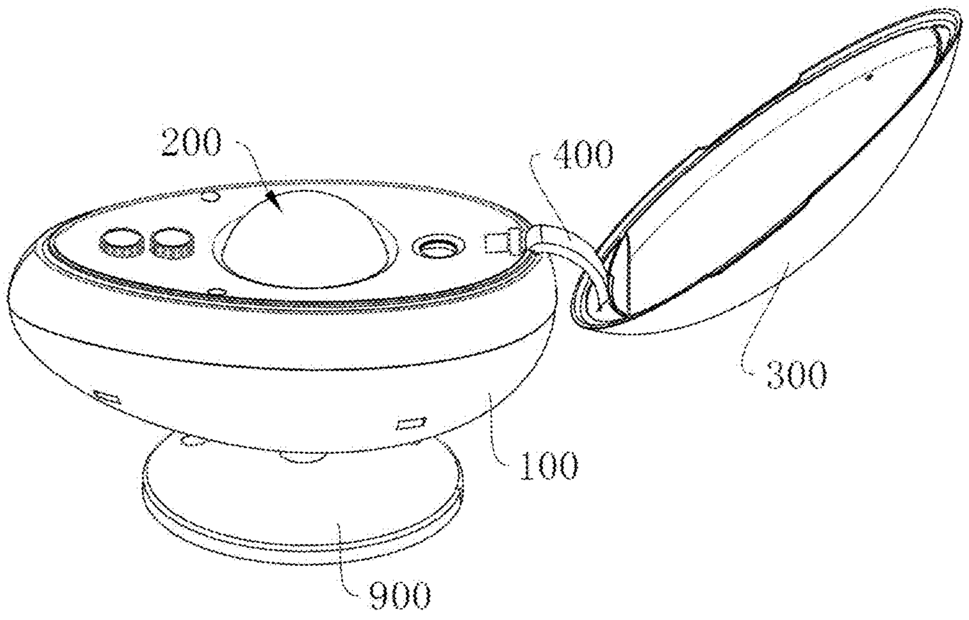
FIG. 1 is a first structural schematic view of a starry sky aurora atmosphere lamp with an integrated lampshade provided in an embodiment of the present application.

Embodiments of the present application are described in detail below, examples of which are illustrated in the drawings, wherein the same or similar reference numerals refer to the same or similar elements or elements having the same or similar functions throughout. The embodiments described below by referring to the drawings are exemplary only for the purpose of explaining the present application and are not to be construed as limiting the present application.

In related art, a starry sky lamp generally project an atmosphere light upwards from a main light source 200, but the starry sky lamp has only single lighting effect that cannot be adjusted accordingly according to changes in usage scenarios and environment.

For example, in low-brightness environment such as at night, this kind of atmosphere light is very glaring. Therefore, a user tends to use a starry sky lamp that emits softer light.

In view of this, the present application provides a starry sky aurora atmosphere lamp with an integrated lampshade, capable of switching among various lighting effects to adapt to changes in usage scenarios and environment.

A starry sky aurora atmosphere lamp with an integrated lampshade according to an embodiment of the present application is described below with reference to FIGS. 1-12D.

Figure 2:
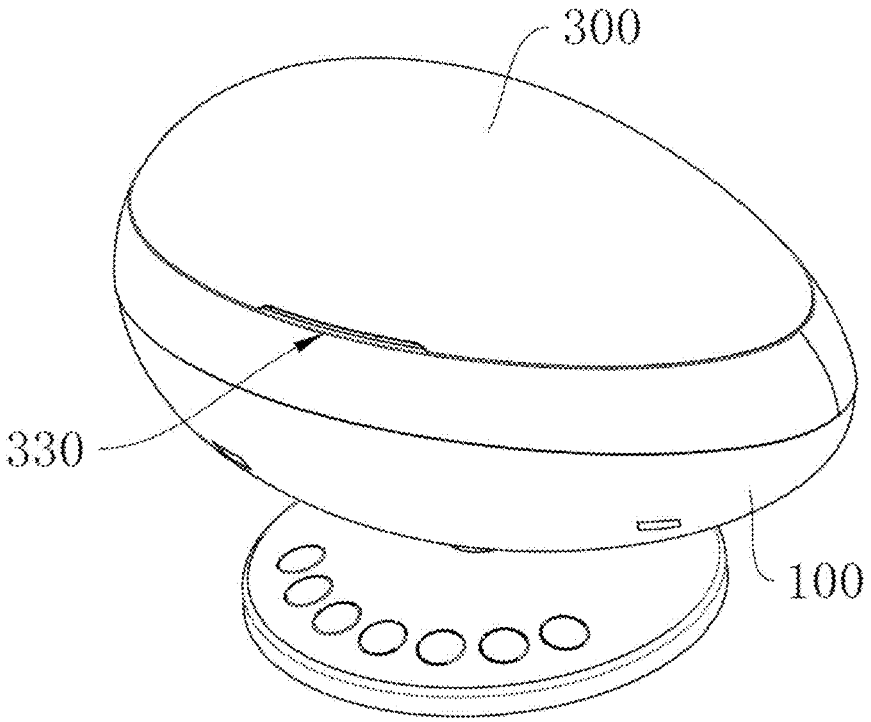
FIG. 2 is a second structural schematic view of a starry sky aurora atmosphere lamp with an integrated lampshade provided in an embodiment of the present application.

As shown in FIGS. 1 and 2, the starry sky aurora atmosphere lamp with an integrated lampshade includes a base 100, a main light source 200, a multi-layer housing 300, and a connector 400.

The main light source 200 is arranged at a center of the base, and is capable of projecting light upwards to form a starry sky atmosphere light.

The main light source 200 includes, but not limited to, an LED light source and a laser light source.

The multiple multi-layer housing 300 is configured to cover the base 100, such that the main light source 200 is located within an accommodating space 110 formed between the base 100 and the multi-layer housing 300; and the multi-layer housing 300 includes a inner light-gathering cover 310 and a semi-obscuring outer cover 320 covering a surface of the inner light-gathering cover 310.

A material of the inner light-gathering cover 310 includes, but not limited to, Polycarbonate (PC), Polypropylene (PP), Polymethyl Methacrylate (PMMA), Polyurethane (PU), silicone and glass.

A material of the semi-obscuring outer cover 320 includes, but not limited to, Polystyrene (PS), Polymethyl Methacrylate (PMMA), Polycarbonate (PC), glass and the like.

In particular, the inner light-gathering cover 310 may be a single accessory for gathering light, and the semi-obscuring outer cover 320 may be a single accessory for semi-obscuring light, and the inner light-gathering cover 310 is detachably connected to the semi-obscuring outer cover 320.

Figure 3A:
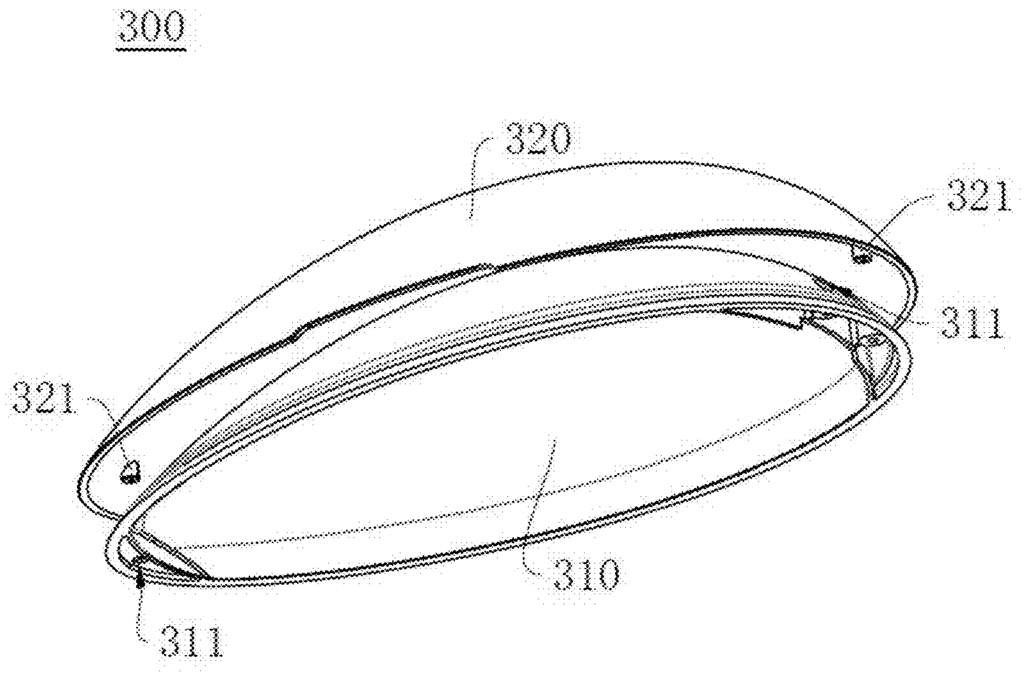
FIG. 3A is a structure schematic view of separated inner light-gathering cover and semi-obscuring outer cover in a multi-layer housing.
Figure 3B:
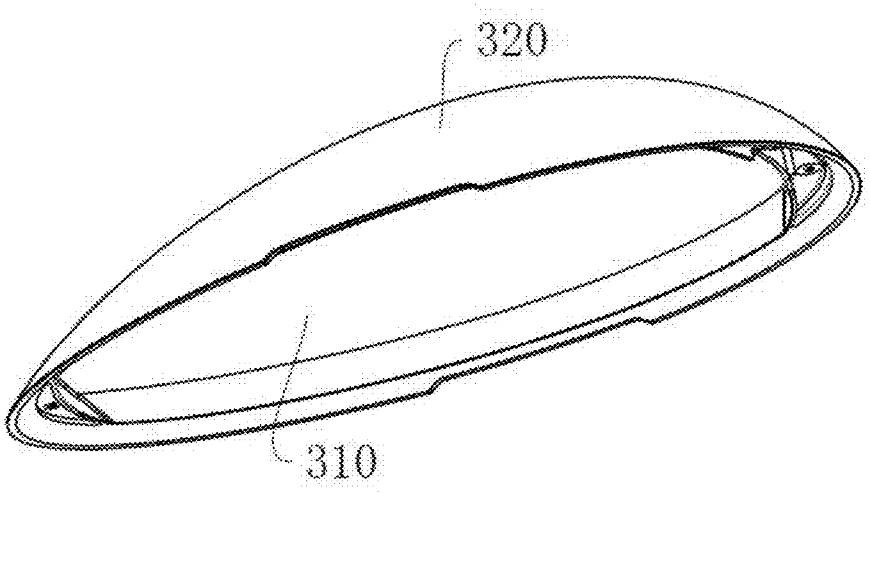
FIG. 3B a structure schematic view of assembled inner light-gathering cover and semi-obscuring outer cover in a multi-layer housing.

As shown in FIGS. 3A and 3B, for example, a positioning hole 311 may be formed at two ends of the inner light-gathering cover 310, and a positioning post 321 may be formed at two ends of the semi-obscuring outer cover 320, and the positioning post 321 is inserted into the positioning hole 311 and fixedly connected with the positioning hole 311 by screws.

Moreover, the inner light-gathering cover 310 and the semi-obscuring outer cover 320 can be integrally formed through dual-color injection molding, IML process, vacuum plating, or other processes, which is not limited in this embodiment.

Colors of the inner light-gathering cover 310 and the semi-obscuring outer cover 320 can be adjusted accordingly according to use requirements, and the colors of the inner light-gathering cover 310 and semi-obscuring outer cover 320 can have a certain color difference. For example, the inner light-gathering cover 310 can be white or semi-transparent, and the semi-obscuring outer cover 320 can be black or black gray.

Moreover, the inner light-gathering cover 310 and the semi-obscuring outer cover 320 can also have other possible color appearances, which is not limited in this embodiment, as long as the inner light-gathering cover 310 achieves light gathering effect, while the semi-obscuring outer cover 320 achieves a semi-obscuring light effect.

As shown in FIG. 1, the connector 400 connects the base 100 with the multi-layer housing 300; and a first end of the connector 400 is rotatably connected to the base 100, and a second end of the connector 400 is fixedly connected to the multi-layer housing 300.

The connector 400 connects the base 100 with the multi-layer housing 300, and the connector 400 is configured such that: when the multi-layer housing 300 is rotated to cover the base 100, the multi-layer housing 300 and the base 100 have continuous integrated appearance, triggering an automatic transition of a light of the starry sky atmosphere lamp into a night lamp light with dynamically changed colored glaze flowing light.

In practical implementation, a switch can be arranged inside the starry sky atmosphere lamp. A user can rotate the multi-layer housing 300 to cover the base 100, the connector 400 abuts against the switch to turn on the switch, thus controlling the light of the starry sky atmosphere lamp transition into a night lamp light with dynamically changed colored glaze flowing light.

The above embodiment of the present application can enable the starry sky aurora atmosphere lamp with the integrated lampshade to emit a lighting effect with appropriate atmosphere based on changes in usage and environment.

For example, when the multi-layer housing 300 does not cover the base 100, the starry sky aurora atmosphere lamp with an integrated lampshade can emit the starry sky atmosphere light and project a light and shadow onto a building, thus beautifying the building and creating an atmosphere.

In low-brightness environment such as at night, the multi-layer housing 300 can be rotated to cover the base 100 through the connector 400, causing the starry sky aurora atmosphere lamp with an integrated lampshade to emit colored glazet light of a small night lamp. The colored glazet light of a small night lamp can be formed by the light emitted by the main light source 200 passing successively through the inner light-gathering cover 310 and the semi-obscuring outer cover 320.

In particular, the inner light-gathering cover 310 gathers the light spreading out toward the center, ensuring that a pattern of the colored glaze of the small night lamp formed by the light is centered, thereby enhancing a viewing angle and making the starry sky aurora atmosphere light with the integrated lampshade more beautiful.

The semi-obscuring outer cover 320 is used to reduce excessive light, and only project a portion of a weak light, which is used to provide illumination for a surrounding environment. The remaining portion of the light can flow on a surface of the semi-obscuring outer cover 320 to form the pattern of the colored glaze of the small night lamp.

In summary, the starry sky aurora atmosphere lamp with an integrated lampshade provided in the embodiment of the present application, on one hand, emit the lighting effect with appropriate atmosphere according to changes in usage scenarios and environment by selecting whether the multi-layer housing 300 covers the base 100; and, on the other hand, the inner light-gathering cover 310 centers the pattern of colored glaze light of the small night lamp formed on the surface of the semi-obscuring outer cover, thereby improving the visible angle and aesthetic appeal. The semi-obscuring outer cover 320 reduces an intensity of transmitted light, making colored glaze light of the small night lamp softer and preventing the light from being projected onto a building, yet still providing decoration and illumination for the surrounding environment.

It should be noted that an appearance of the starry sky aurora atmosphere lamp with an integrated lampshade is one selected from a group consisting of: cube, cuboid, sphere, truncated cone, truncated pyramid, and ellipsoid, without limitation in this embodiment.

As shown in FIG. 2, in actual implementation, when the multi-layer housing 300 is rotated to cover the base 100 through the connector 400, an accessing opening 330 is formed between the multi-layer housing 300 and the base 100.

This design facilitates users inserting their hand into the accessing opening 330, allowing the multi-layer housing 300 to be rotatably opened relative to the base 100.

Figure 4:
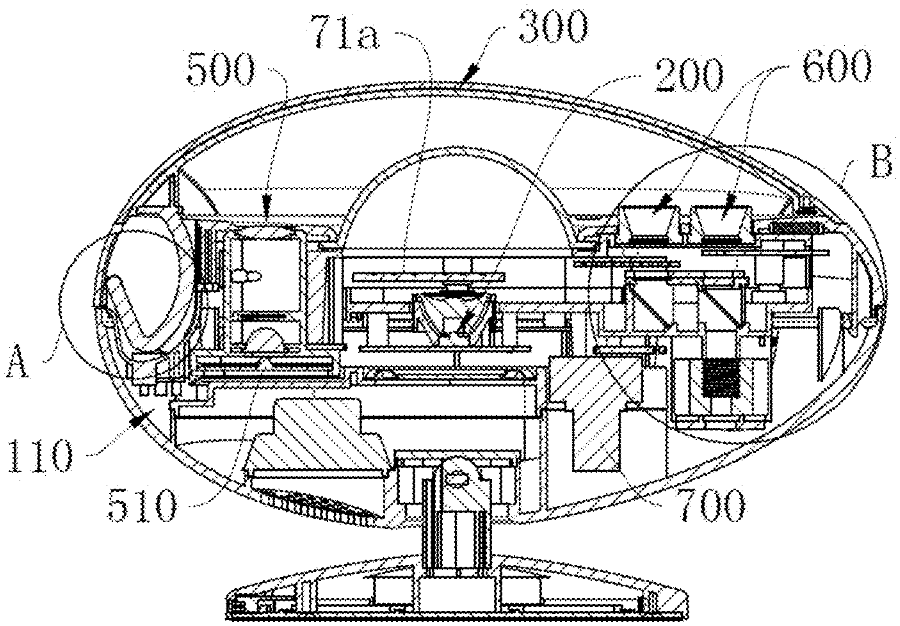
FIG. 4 is a first cross-sectional view of a starry sky aurora atmosphere lamp with an integrated lampshade provided in an embodiment of the present application.
Figure 5:
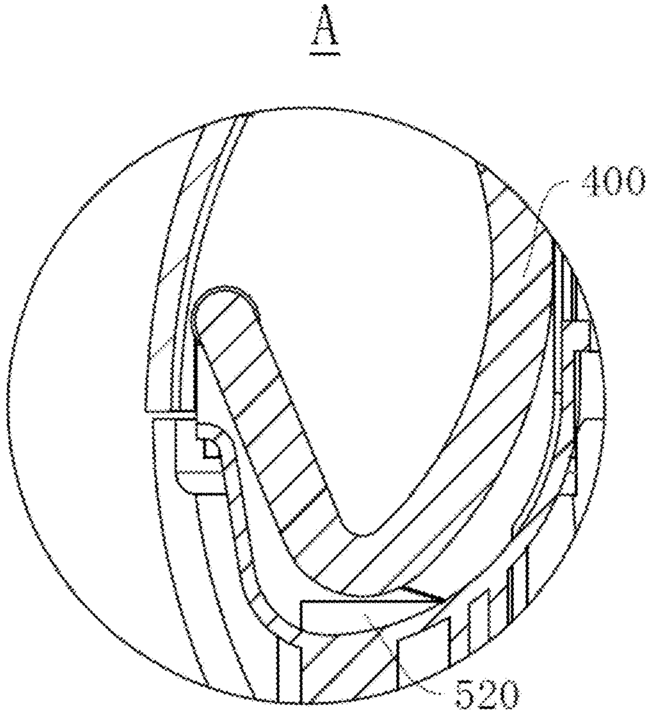
FIG. 5 is a partial enlarged view of Portions A and B in FIG. 4.
Figure 5:
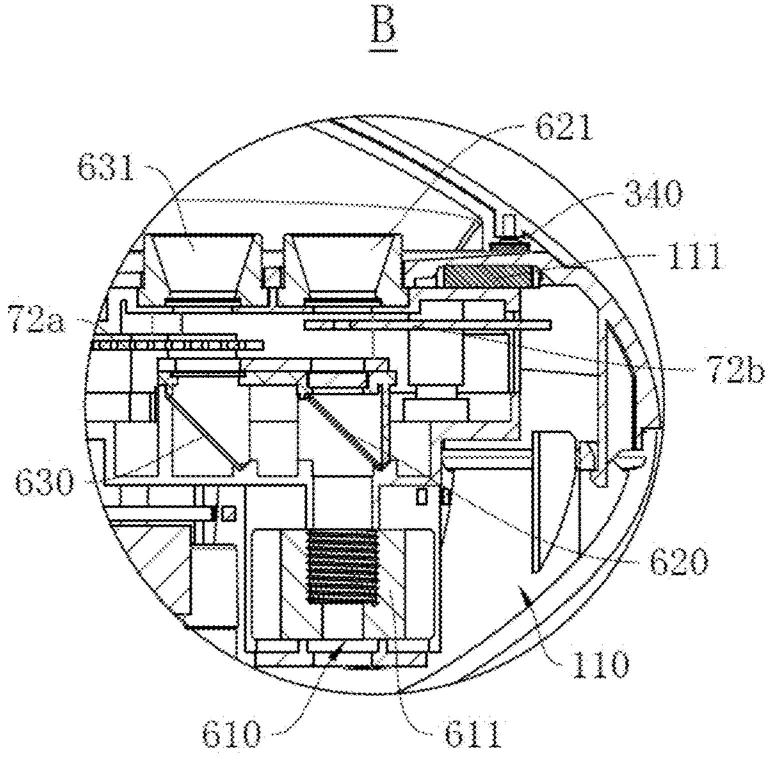

As shown in FIGS. 4 and 5, in actual implementation, a magnet 111 is arranged within the accommodating space 110 of the base 100, and a magnetic iron plate 340 is arranged inside the multi-layer housing 300. When the multi-layer housing 300 is rotated to cover the base 100, the magnet 111 attracts the magnetic iron plate 340.

This design can improve a stability of the multi-layer housing 300 on the base 100, and prevent the multi-layer housing 300 from rotating relative to the base 100 under a condition of no manual operation.

As shown in FIGS. 4 and 5, in some embodiments, a first auxiliary light source 500 is further arranged in the base 100 at a first side of the main light source 200, and the first auxiliary light source 500 is configured to be turned on when the main light source 200 is turned off and turned off when the main light source 200 is turned on.

In this embodiment, the first auxiliary light source 500 is used for projecting an atmosphere light upwards, which forms colored glaze light of the small night lamp when the multi-layer housing 300 covers the base 100.

Moreover, the first auxiliary light source 500 may also cooperate with the main light source 200 or a second auxiliary light source 600, to be mentioned later, to form the colored glaze of the small night lamp, which is not limited in this embodiment.

As shown in FIGS. 4 and 5, in some embodiments, the first auxiliary light source 500 includes a circuit board, a first auxiliary lighting element 510 arranged on the circuit board, and a switch 520 for controlling the first auxiliary lighting element 510 to be turned on or turned off.

The first auxiliary lighting element 510 includes, but not limited to, an LED light source and a laser light source, and the switch 520 includes, but not limited to, a proximity switch.

The connector 400 is configured to abut against the switch 520 to control the switch 520 to be turned on when the multi-layer housing 300 covers the base 100, and opened by the connector 400 is configured to move away from the switch 520 to control the switch 520 to be turned off when the multi-layer housing 300 is opened by a maximum angle.

In this embodiment, the first auxiliary lighting element 510 may be controlled to be turned on or off by the switch 520.

When the multi-layer housing 300 covers the base 100, the connector 400 abuts against a sensing end of the switch 520, and the switch 520 controls the first auxiliary lighting element 510 to be turned on.

The first auxiliary lighting element 510 is used for projecting the atmosphere light, which can form the colored glaze of the small night lamp, or the first auxiliary lighting element 510 can project the atmosphere light in conjunction with the main light source 200 and a second auxiliary light source 600, to be mentioned later, to form the colored glaze of the small night lamp.

When the multi-layer housing does not cover the base 100 and is opened by a certain angle, such as 5° to 10°, the connector 400 moves away from the sensing end of the switch 520, and the switch 520 controls the first auxiliary lighting element 510 to be turned off.

At this time, the main light source 200 and the second auxiliary light source 600, to be mentioned later, can project the atmosphere light to form the starry sky atmosphere light.

That is, in the above embodiment, a state of the multi-layer housing 300 covering the base 100 is determined by judging whether the connector 400 abuts against the sensing end of the switch 520, thus enabling the starry sky aurora atmosphere lamp with an integrated lampshade emits the lighting effect with appropriate atmosphere according to changes in usage scenarios and environment.

As shown in FIGS. 4 and 5, in some embodiments, a second auxiliary light source 600 is further arranged in the base 100 at a second side of the main light source 200; and the second auxiliary light source 600 is configured to project a movable point light source or line light source onto the multi-layer housing 300.

In this embodiment, the second auxiliary light source 600 can project a point light source or a line light source upwards, and the second auxiliary light source 600 can cooperate with the first auxiliary lighting element 510 and the main light source 200 to form the starry sky atmosphere light or the colored glaze of the small night lamp.

Figure 6:
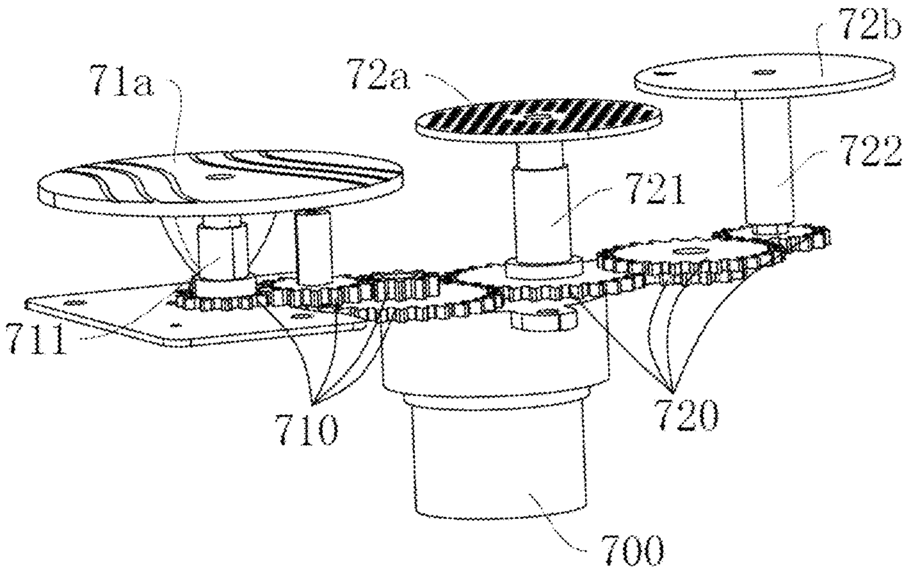
FIG. 6 is a first partial structural schematic view of a multi-layer housing provided in an embodiment of the present application.

As shown in FIGS. 4-6, in some embodiments, the starry sky aurora atmosphere lamp with an integrated lampshade further includes a drive element 700.

The drive element 700 is configured to at least control the second auxiliary light source 600 to project a movable point light source or line light source onto the multi-layer housing 300.

In this embodiment, the drive element 700 enables the second auxiliary light source 600 to project the movable point light source or line light source onto the multi-layer housing 300. Compared to projecting a position stationary point light source or line light source, the effect of forming the starry sky atmosphere light or the colored glaze of the small night lamp is more diverse.

In practical implementation, the starry sky aurora atmosphere lamp with an integrated lampshade further includes a first gear set 710 dynamically coupled with the drive element 700, and a second gear set 720 meshing with the first gear set 710.

The first gear set 710 is dynamically coupled with the drive element 700, the first gear set 710 is defined with a first shaft 711, and the second gear set 720 is defined with at least a second shaft 721, which directly or indirectly meshes with the first shaft 711; and a second light effect adjustment plate **72*a* is arranged on the second shaft 721, and the second light effect adjustment plate 72*a* is configured for adjusting a light output effect of the second auxiliary light source 600**.

The second light effect adjustment plate **72*a* is positioned directly above the second auxiliary light source 600, and the light emitted by the second auxiliary light source 600 can present different light-and-shadow patterns after passing through the second light effect adjustment plate 72*a***.

Figure 7:
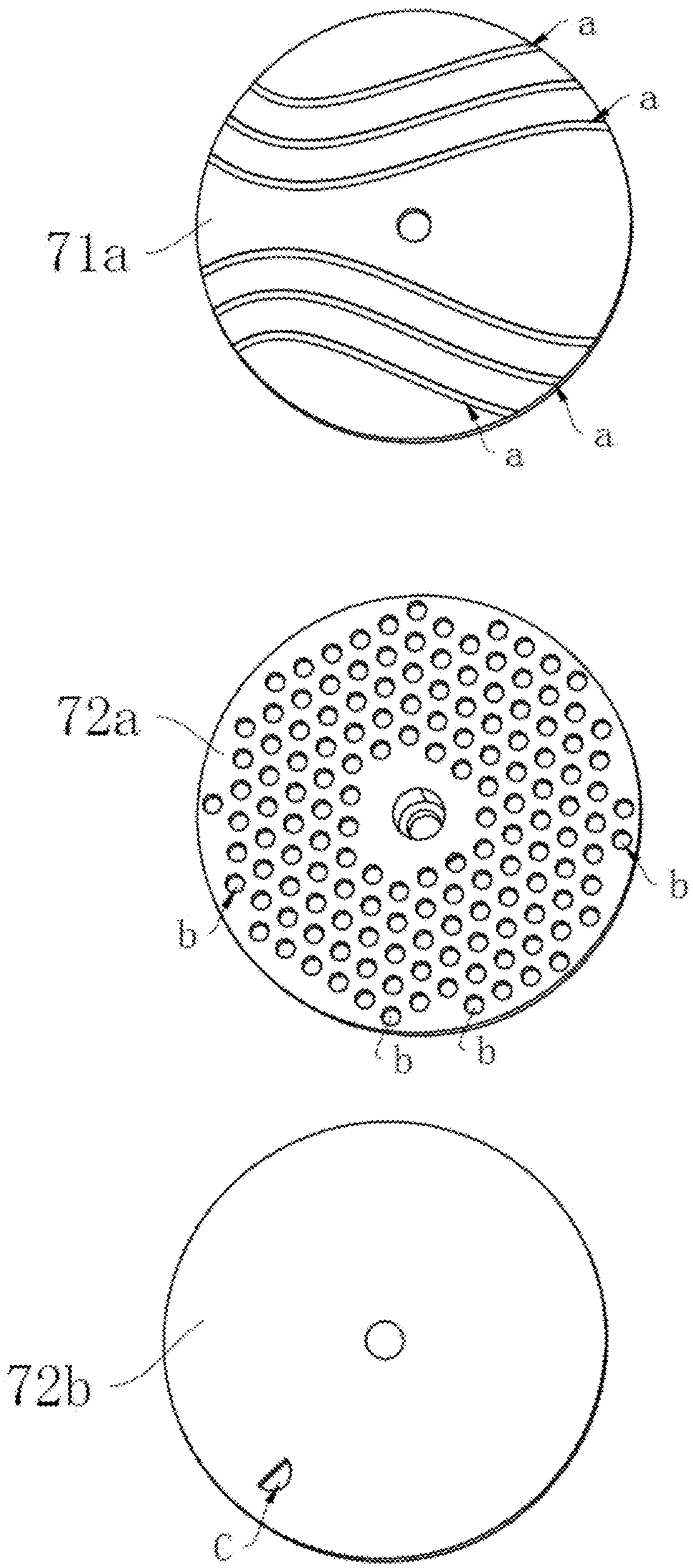
FIG. 7 is a structural schematic view of a first light effect adjustment plate, a second light effect adjustment plate, and a third light effect adjustment plate, provided in an embodiment of the present application.

As shown in FIG. 7, for example, several star-shaped slots b can be formed on the second light effect adjustment plate **72*a*, and the light emitted by the second auxiliary light source 600** passes through these star-shaped slots b, presenting a light and shadow of starry sky.

It should be noted that in this embodiment, the main light source 200 can be controlled by another driving device to emit the point source or the line light source of the starry sky atmosphere light.

As shown in FIGS. 6 and 7, in some embodiments, the drive element 700 is configured to control the second auxiliary light source 600 to project the movable point light source or line light source onto the multi-layer housing 300 and to control the lighting effect of the main light source 200.

In practical implementation, the starry sky aurora atmosphere lamp with an integrated lampshade further includes a first gear set 710 dynamically coupled with the drive element 700, and a second gear set 720 meshing with the first gear set 710.

The first gear set 710 is defined with a first shaft 711, and the second gear set 720 is at least defined with a second shaft 721; a first light effect adjustment plate **71*a* is arranged on the first shaft 711, and a second light effect adjustment plate 72*a* is arranged on the second shaft 721; the first light effect adjustment plate 71*a* is configured for adjusting a lighting effect of the main light source 200, and the second light effect adjustment plate 72*a* is configured for adjusting a lighting effect of the second auxiliary light source 600**.

In this embodiment, the first light effect adjustment plate **71*a* is positioned directly above the main light source 200, the light emitted by the main light source 200 can present different light-and-shadow patterns after passing through the first light effect adjustment plate 71*a***.

As shown in FIG. 7, for example, a wavy groove a can be formed on the first light effect adjustment plate **71*a*, and the light emitted by the main light source 200** passes through the wavy groove a, presenting a light and shadow of Milky Way.

The second light effect adjustment plate **72*a* is positioned directly above the second auxiliary light source 600, and the light emitted by the second auxiliary light source 600 can also present different light-and-shadow patterns after passing through the second light effect adjustment plate 72*a***.

As shown in FIG. 7, for example, several star-shaped slots b can be formed on the second light effect adjustment plate **72*a*, and the light emitted by the second auxiliary light source 600** passes through these star-shaped slots b, presenting a light and shadow of starry sky.

Moreover, this embodiment uses only one drive element 700 as a power source for driving the first gear set 710 and the second gear set 720, improving a space utilization rate of the base 100.

As shown in FIGS. 5 and 6, in some embodiments, the second gear set 720 is defined with at least a third shaft 722 parallel to the second shaft 721, and a third light effect adjustment plate 72*b* is arranged on the third shaft 722; the second auxiliary light source 600 includes a light source element 610, a beam splitter 620 located in a light output direction of the light source element 610, a reflector 630 arranged parallel to the beam splitter 620, a first reflective cup 621 arranged corresponding to the beam splitter 620, and a second reflective cup 631 arranged corresponding to the reflector 630; and the second light effect adjustment plate 72*a* corresponds in position to the first reflective cup 621, and the third light effect adjustment plate 72*b* corresponds in position to the second reflective cup 631.

In this embodiment, the second light effect adjustment plate 72*a* is positioned directly above the first reflective cup 621, and the third light effect adjustment plate 72*b* is positioned directly above the second reflective cup 631.

When the light emitted by the second auxiliary light source 600 passes through the beam splitter 620, a portion of the light is directed towards the first reflective cup 621, which is used to increase an illumination range of this portion of the light and guide it towards the second light effect adjustment plate 72*a*.

In practical implementation, several star-shaped slots b can be formed on the second light effect adjustment plate 72*a*, allowing the light passing through these slots to present a light and shadow of starry sky.

After passing through the beam splitter 620, another portion of the light is directed towards the second reflective cup 631, which is used to increase the illumination range of this part of the light and guide it towards the third light effect adjustment plate 72*b*.

In practical implementation, a crescent-shaped slot c can be formed on the third light effect adjustment plate 72*b*, allowing the light passing through the slot to present a light and shadow of crescent moon.

In the above embodiment, only one second auxiliary light source 600 is used as a light source, which improves the space utilization rate of the base 100 and also allows the light emitted by the light source to present different effects.

Specifically, when the multi-layer housing 300 does not cover the base 100, the drive element 700 simultaneously drives the first light effect adjustment plate 71*a*, the second light effect adjustment plate 72*a*, and the third light effect adjustment plate 72*b* to rotate, so that light can be projected onto buildings and presenting a light-and-shadow pattern of Milky Way flowing, starry sky flickering, and crescent moon flickering, forming the starry sky atmosphere light.

When the multi-layer housing 300 covers the base 100, the drive element 700 also simultaneously drives the first light effect adjustment plate 71*a*, the second light effect adjustment plate 72*a*, and the third light effect adjustment plate 72*b* to rotate, presenting a flowing light-and-shadow pattern on the surface of the multi-layer housing 300, forming a colored glaze light of the small night lamp.

In practical implementation, the first light effect adjustment plate 71*a*, the second light effect adjustment plate 72*a*, and the third light effect adjustment plate 72*b* include, but not limited to, ripple plates.

Figure 12A:
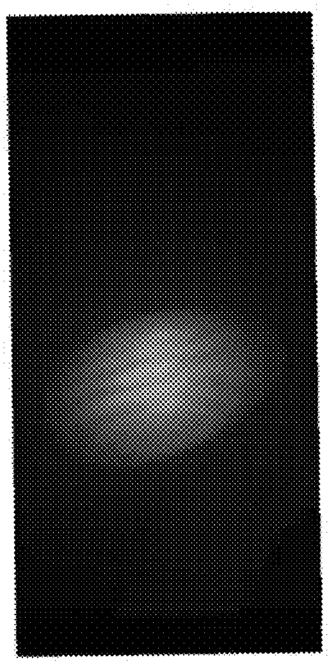
FIG. 12A is a first schematic view of a light-and-shadow pattern of a starry sky aurora atmosphere lamp with an integrated lampshade provided in an embodiment of the present application, when a multi-layer housing covers a base.
Figure 12B:
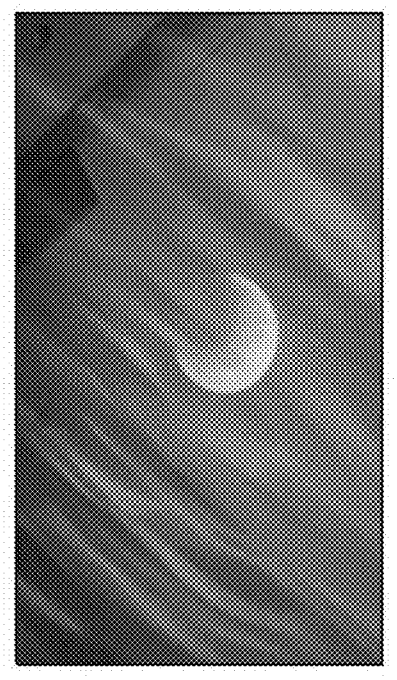
FIG. 12B is a second schematic view of a light-and-shadow pattern of a starry sky aurora atmosphere lamp with an integrated lampshade provided in an embodiment of the present application, when the multi-layer housing does not cover the base.

As shown in FIGS. 12A and 12B, the lighting effect passes through the first light effect adjustment plate 71*a* and the third light effect adjustment plate 72*b* can present a light and shadow of Milky Way and crescent moon, where a position of the light and shadow of crescent moon is static while a position of the light and shadow of Milky Way can be flowing to form dynamically changed colored glaze flowing light.

Figure 12C:
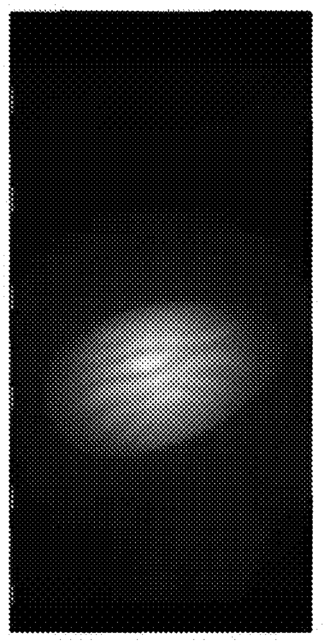
FIG. 12C is a second schematic view of a light-and-shadow pattern of a starry sky aurora atmosphere lamp with an integrated lampshade provided in an embodiment of the present application, when a multi-layer housing covers a base.
Figure 12D:
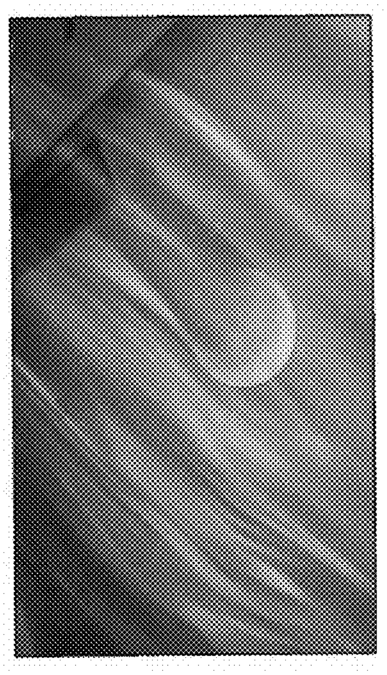
FIG. 12D is a third schematic view of a light-and-shadow pattern of a starry sky aurora atmosphere lamp with an integrated lampshade provided in an embodiment of the present application, when a multi-layer housing does not cover a base.

As shown in FIGS. 12C and 12D, the lighting effect passes through the first light effect adjustment plate 71*a*, the second light effect adjustment plate 72*a*, and the third light effect adjustment plate 72*b* can present a light and shadow of Milky Way, crescent moon and starry sky, where positions of the light and shadow of crescent moon and starry sky are static, while a position of the light and shadow of Milky Way can be flowing and can display in different colors to form dynamically changed colored glaze flowing light.

Figure 8:
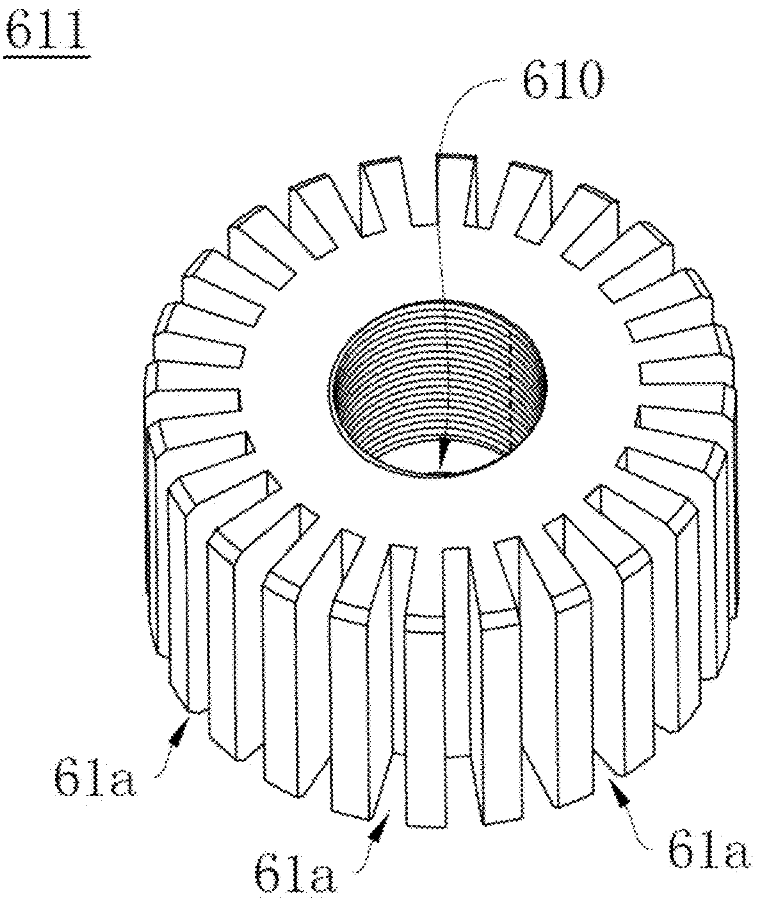
FIG. 8 is a structural schematic view of a light source holder provided in an embodiment of the present application.

As shown in FIG. 8, in practical implementation, a light source holder 611 is arranged in the accommodating space 110 within the base 100, the light source holder 611 is used to install the light source element 610 of the second auxiliary light source 600; and a perimeter of the light source holder 611 can be uniformly defined with a strip-shaped notches 61*a*, which increase a heat dissipation area of the light source holder 611, thereby effectively cooling the light source element 610.

Figure 9A:
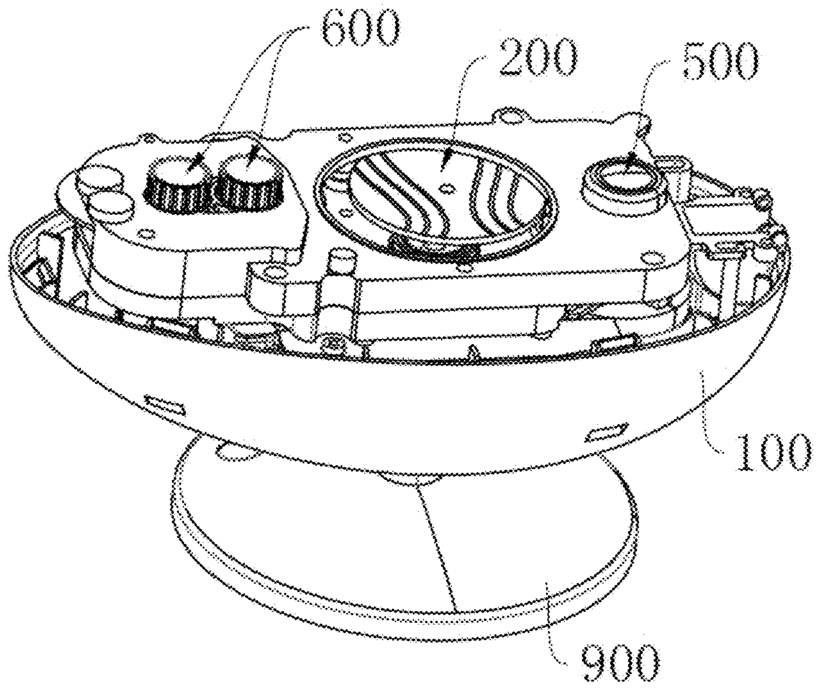
FIG. 9A is a second partial structural schematic view of a multi-layer housing provided in an embodiment of the present application.
Figure 9B:
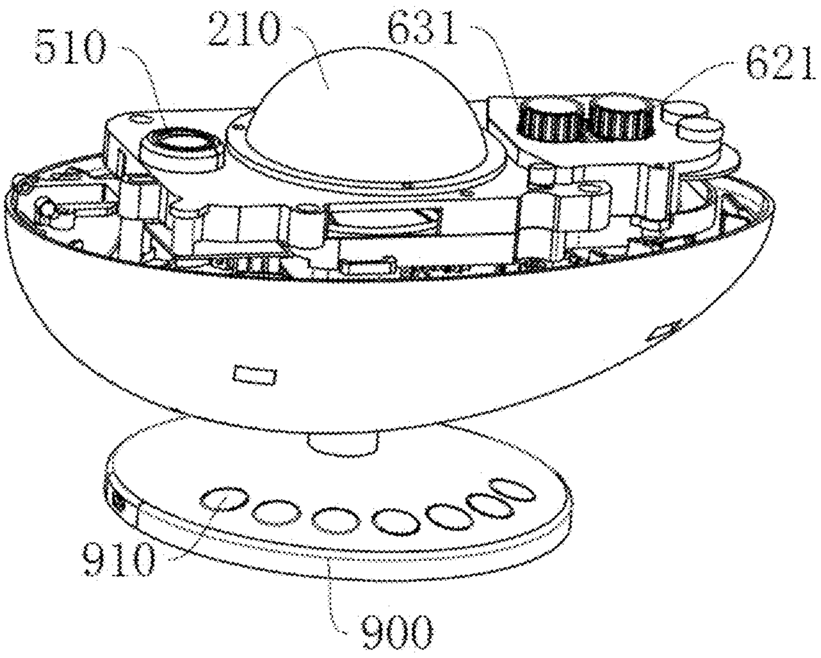
FIG. 9B is a third partial structural schematic view of a multi-layer housing provided in in an embodiment of the present application.

As shown in FIGS. 9A and 9B, in practical implementation, a cover body 210 can cover the first light effect adjustment plate 71*a* as needed.

The cover body 210 can be an LED gathering cover, which can improve a directionality of a projected light and shadow.

The cover body 210 can also be a transparent light-transmitting cover with various textures, which can increase diversity of patterns of the projected light and shadow.

The cover body 210 can be made from materials including, but not limited to, Polymethyl Methacrylate (PMMA), Polycarbonate (PC), Polystyrene (PS), or glass.

Figure 10A:
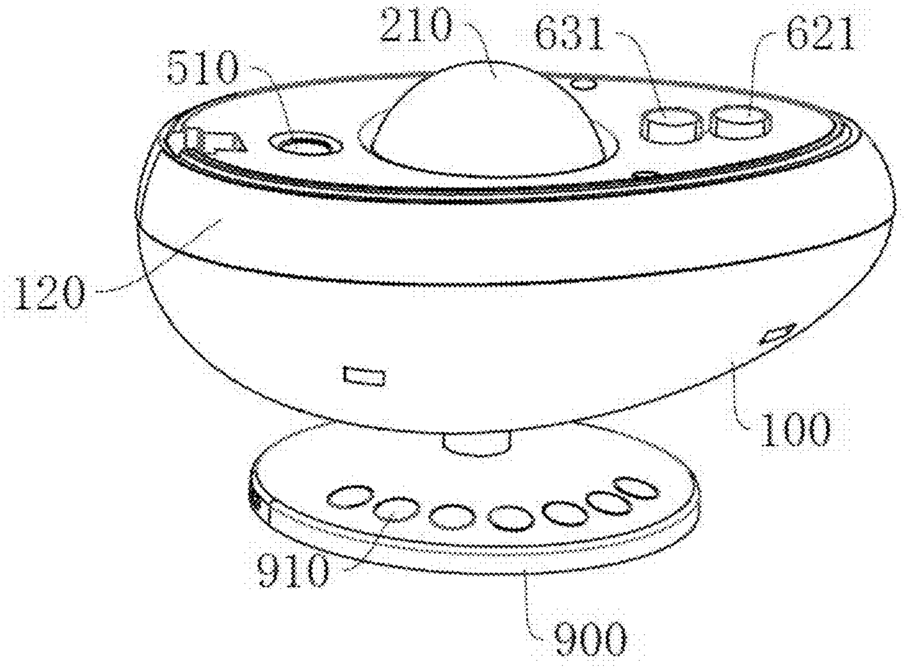
FIG. 10A is a fourth partial structural schematic view of a multi-layer housing provided in an embodiment of the present application.
Figure 10B:
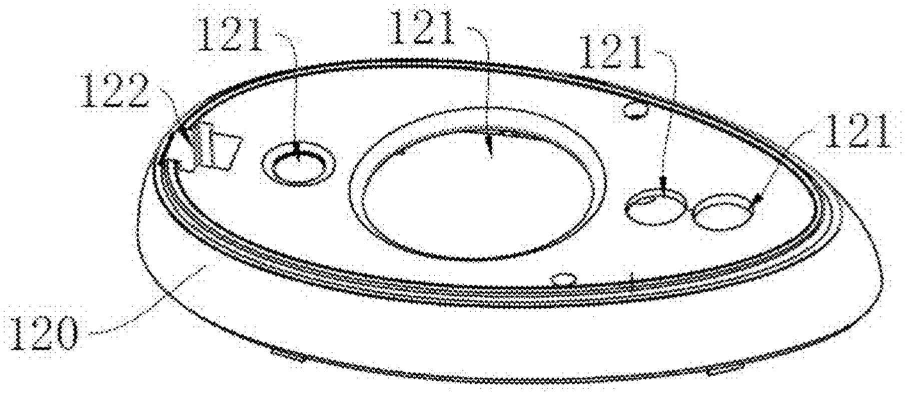
FIG. 10B is a structural schematic view of an installation cover provided in an embodiment of the present application.

As shown in FIGS. 10A and 10B, in some embodiments, an installation cover 120 is arranged on the base 100.

The installation cover 120 is defined with a first yielding hole 121 exposing the cover body 210, the first auxiliary lighting element 510, the first reflective cup 621 and the second reflective cup 631, respectively.

In this embodiment, by arranging the installation cover 120, on the one hand, dust is prevented from entering an area between the base 100 and the installation cover 120, acting as a dust barrier, and on the other hand, a problem of the main light source 200, the first auxiliary light source 500, and the second auxiliary light source 600 crosstalk in the starry sky aurora atmosphere lamp with the integrated lampshade is minimized as much as possible.

In practical implementation, a light-blocking part for separating the main light source 200, the first auxiliary light source 500 and the second auxiliary light source 600 is arranged in the installation cover 120, and at least the main light source 200, the first auxiliary light source 500 and the second auxiliary light source 600 can be prevented from being crosstalk in the installation cover 120 by the light-blocking part.

The installation cover 120 can be detachably connected to the base 100 by a screw or can be integrally formed with the base 100, which is not limited in this embodiment.

Figure 11A:
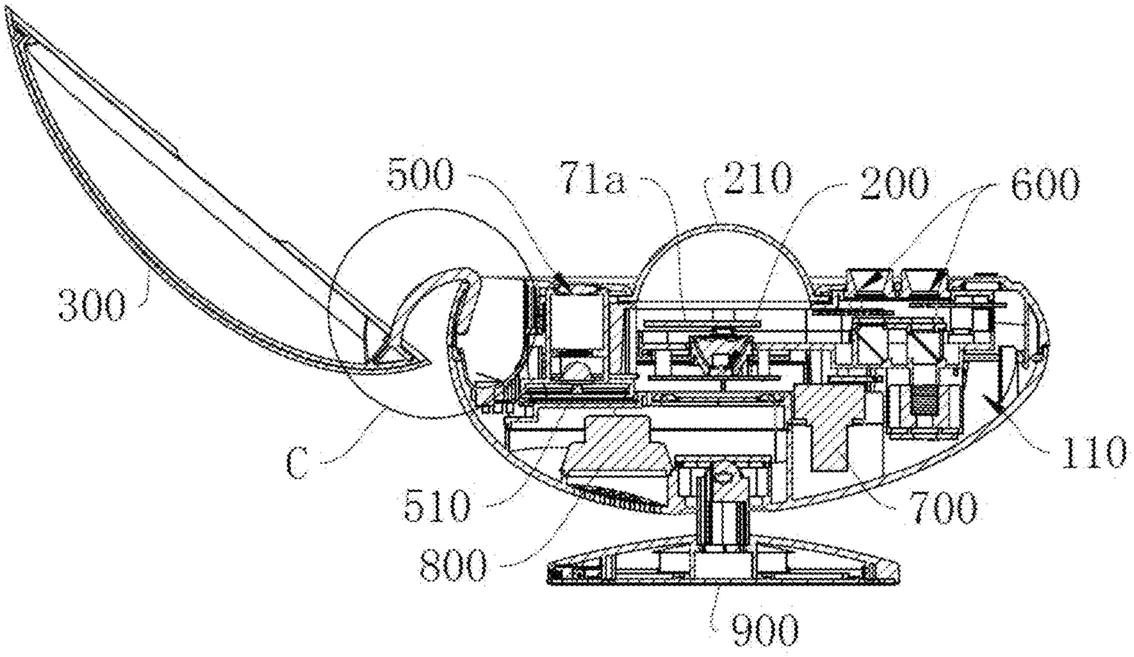
FIG. 11A is a second cross-sectional view of the starry sky aurora atmosphere lamp with an integrated lampshade provided in an embodiment of the present application.
Figure 11B:
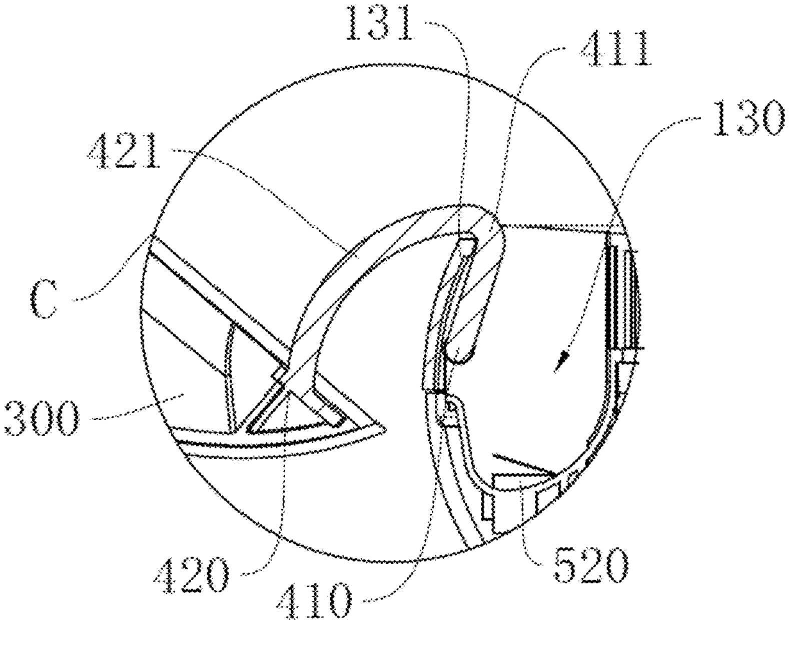
FIG. 11B is a partial enlarged view of Portion C in FIG. 11A.

As shown in FIGS. 11A and 11B, in some embodiments, the first end 410 of the connector 400 is rotatably connected to the base 100, and the second end 420 of the connector 400 is fixedly connected to the multi-layer housing 300. The connector 400 is configured such that: when the multiple the multi-layer housing 300 covers the base 100, the connector 400 is accommodated to the base 100, and when the multi-layer housing 300 is opened by a maximum angle, one end of the multi-layer housing 300 fixed with the connector 400 is spaced apart from an outer wall of the base 100.

In related arts, there is on multi-layer housing 300 arranged, and, instead, a light source within the base 100 are directly exposed, which can damage the light source. As another solution, a detachable protective cover is arranged on the base 100, which, however, can easily lead to a loss of the protective cover when detached during use.

In the above embodiment of the present application, the multi-layer housing 300 is rotatably arranged on the base 100 through the connector 400, ensuring that the multi-layer housing 300 is not completely separated from the base 100 even in use.

Moreover, when the multi-layer housing 300 is opened by the maximum angle, the connector 400 abuts against the outer side wall of the base 100, so that the multi-layer housing 300 is spaced apart from the outer wall of the base 100, which can avoid a problem that the multi-layer housing 300 is broken due to direct collision between the multi-layer housing 300 and the base 100 when a force for opening the multi-layer housing 300 is too large.

In practical implementation, the first end 410 of the connector 400 can be rotatably connected to the base 100 through a pivot, and the second end 420 is fixed to the inner light-gathering cover 310 by screws.

A rotation manner of the first end 410 of the connector 400 and the base 100 is not limited herein, and it should be understood that the pivot may be driven by the driving motor to rotate relative to the base 100, or may be driven by manually rotating the multi-layer housing 300 to rotate relative to the base 100.

As shown in FIGS. 11A and 11B, in some embodiments, the connector 400 includes a first connecting section 411 and a second connecting section 421 between the first end 410 and the second end 420, and the first connecting section 411 and the second connecting section 421 are connected to form a fishhook shape. A stopper part 131 is arranged on the base 100. When the multi-layer housing 300 is opened by the maximum angle, the first connecting section 411 can hook the stopper part 131, and the second connecting section 421 can be positioned outside the base 100.

In this embodiment, when the multi-layer housing 300 is opened by the maximum angle, the first connecting section 411 can hook the stopper part 131, which can make the position of the multi-layer housing 300 more stable.

In practical implementation, the maximum angle at which the multi-layer housing 300 is opened can be 140° to make the multi-layer housing 300 more aesthetically pleasing to the base 100.

Moreover, the maximum angle at which the multi-layered housing 300 is opened may be other possible angles, which is not limited in this embodiment.

As shown in FIGS. 10A, 10B, 11A, and 11B, in some embodiments, an installation cover 120 is arranged on the base 100.

The installation cover 120 is further defined with a second hole 122 through which the second end 420 of the connector 400 can extend.

The installation cover 120 and the base 100 together form an accommodating cavity 130, and the first end 410 of the connector 400 is rotatably arranged inside the accommodating cavity 130. A side wall of the accommodating cavity 130 is the stopper part 131 of the base 100, the first end 410 of the connector 400 is adjacent to the side wall of the accommodating cavity 130, and the second end 420 of the connector 400 is fixed to the multi-layer housing 300.

In this embodiment, the first end 410 of the connector 400 is adjacent to the side wall of the accommodating cavity 130, which can reduce a space occupied by the accommodating cavity 130 within the base 100.

As shown in FIGS. 11A and 11B, in some embodiments, a sound system 800 is further arranged in the base 100, adapted to be turned on when the starry sky aurora atmosphere lamp with an integrated lampshade projects either the starry sky atmosphere light or the colored glaze of the small night lamp.

It should be noted that the starry sky atmosphere light and the colored glaze of the small night lamp have different lighting atmosphere modes. Under different lighting atmosphere modes, the starry sky atmosphere light and the colored glaze of the small night lamp present patterns in various colors.

For example, the lighting atmosphere modes include, but not limited to, the first lighting atmosphere mode, the second lighting atmosphere mode, the third lighting atmosphere mode, the fourth lighting atmosphere mode, the fifth lighting atmosphere mode, the sixth lighting atmosphere mode, and the seventh lighting atmosphere mode.

The following takes the above seven light atmosphere modes as examples, and with reference to FIGS. 12A-12D, the embodiments of the present application are specifically described from seven different implementation perspectives.

1. In the first lighting atmosphere mode:

The light emitted by the main light source 200 passes through a wavy groove a on the first light effect adjustment plate 71*a*, presenting a light-and-shadow pattern of Milky Way.

2. In the second lighting atmosphere mode:

A portion of the light emitted by the second auxiliary light source 600 passes through several star-shaped slots b on the second light effect adjustment plate 72*a*, presenting a light-and-shadow pattern of starry sky.

3. In the third lighting atmosphere mode:

Another portion of the light emitted by the second auxiliary light source 600 passes through a crescent-shaped slot c on the third light effect adjustment plate 72*b*, presenting a light-and-shadow pattern of crescent moon.

It should be noted that at least two of the first lighting atmosphere mode, the second lighting atmosphere mode, and the third lighting atmosphere mode can be combined with each other. The following is an example of a combination of the first lighting atmosphere mode, the second lighting atmosphere mode, and the third lighting atmosphere mode.

As shown in FIGS. 12A-12D, the light emitted by the main light source 200 passes through the wavy groove a on the first light effect adjustment plate 71*a*, presenting the light-and-shadow pattern of Milky Way.

A portion of the light emitted by the second auxiliary light source 600 passes through several star-shaped slots b on the second light effect adjustment plate 72*a*, presenting the light-and-shadow pattern of starry sky.

Another portion of the light emitted by the second auxiliary light source 600 passes through the crescent-shaped slot c on the third light effect adjustment plate 72*b*, presenting the light-and-shadow pattern of crescent moon.

When the multi-layer housing 300 does not cover the base 100, and, instead, is opened by the maximum angle, the connector 400 is separated from the sensing end of the switch 520, causing the switch 520 to control the first auxiliary lighting element 510 to be turned off.

That is, the above three light-and-shadow patterns cooperate with each other. They can be projected onto a building, so that the light-and-shadow patterns of Milky Way, starry sky and crescent moon are presented to form the starry sky atmosphere lamp light.

When the multi-layer housing 300 covers the base 100, the connector 400 abuts against the sensing end of the switch 520, causing the switch 520 to control the first auxiliary lighting element 510 to be turned on.

The light emitted by the first auxiliary lighting element 510 and the above three light-and-shadow patterns are matched, so that the light-and-shadow pattern can be presented on the surface of the multi-layer housing 300 to form the colored glaze of the small night lamp.

4. In the fourth lighting atmosphere mode:

The first light effect adjustment plate 71*a*, the second light effect adjustment plate 72*a*, and the third light effect adjustment plate 72*b* rotate synchronously under the drive of the drive element 700.

The light emitted by the main light source 200 passes through a wavy groove a on the first light effect adjustment plate 71*a*, presenting a flowing light-and-shadow pattern of Milky Way.

5. In the fifth lighting atmosphere mode:

The first light effect adjustment plate 71*a*, the second light effect adjustment plate 72*a*, and the third light effect adjustment plate 72*b* rotate synchronously under the drive of the drive element 700.

A portion of the light emitted by the second auxiliary light source 600 passes through several star-shaped slots b on the second light effect adjustment plate 72*a*, presenting a flickering light-and-shadow pattern of starry sky.

6. In the sixth lighting atmosphere mode:

The first light effect adjustment plate 71*a*, the second light effect adjustment plate 72*a*, and the third light effect adjustment plate 72*b* rotate synchronously under the drive of the drive element 700.

Another portion of the light emitted by the second auxiliary light source 600 passes through a crescent-shaped slot c on the third light effect adjustment plate 72*b*, presenting a flickering light-and-shadow pattern of crescent moon.

It should be noted that at least two of the fourth lighting atmosphere mode, the fifth lighting atmosphere mode, and the sixth lighting atmosphere mode can be combined with each other. The following is an example of a combination of the fourth lighting atmosphere mode, the fifth lighting atmosphere mode, and the sixth lighting atmosphere mode.

As shown in FIGS. 12A-12D, the first light effect adjustment plate 71*a*, the second light effect adjustment plate 72*a*, and the third light effect adjustment plate 72*b* rotate synchronously under the drive of the drive element 700.

The light emitted by the main light source 200 passes through the wavy groove a on the first light effect adjustment plate 71*a*, presenting the flowing light-and-shadow pattern of Milky Way.

A portion of the light emitted by the second auxiliary light source 600 passes through several star-shaped slots b on the second light effect adjustment plate 72*a*, presenting a flickering light-and-shadow pattern of starry sky.

Another portion of the light emitted by the second auxiliary light source 600 passes through a crescent-shaped slot c on the third light effect adjustment plate 72*b*, presenting a flickering light-and-shadow pattern of crescent moon.

That is, the above three light-and-shadow patterns can cooperate with each other and can be projected onto a building, so that the light-and-shadow patterns of Milky Way flowing, starry sky flickering and crescent moon flickering are presented, so as to form the starry sky atmosphere lamp light.

When the multi-layer housing 300 covers the base 100, the connector 400 abuts against the sensing end of the switch 520, causing the switch 520 to control the first auxiliary lighting element 510 to be turned on.

The light emitted by the first auxiliary lighting element 510 and the above three light-and-shadow patterns are matched, so that the flowing light-and-shadow pattern can be presented on the surface of the multi-layer housing 300 to form the colored glaze light of the small night lamp.

7. In the seventh lighting atmosphere mode:

A color of the light emitted by the main light source 200 is adjustable.

Illustratively, the first light effect adjustment plate 71*a*, the second light effect adjustment plate 72*a*, and the third light effect adjustment plate 72*b* rotate synchronously under the drive of the drive element 700.

At this time, the light emitted by the main light source 200 passes through a wavy groove a on the first light effect adjustment plate 71*a*, presenting a flowing light-and-shadow pattern of Milky Way, a color of which is adjustable.

When the multi-layer housing 300 does not cover the base 100, and, instead, is opened by a maximum angle, the connector 400 is separated from the sensing end of the switch 520, causing the switch 520 to control the first auxiliary lighting element 510 to be turned off.

The flowing light and shadow of Milky Way, in combination with the flickering light and shadow of starry sky and the flickering light and shadow of crescent moon, can be projected onto the building to form the starry sky atmosphere light.

When the multi-layer housing 300 300 covers the base 100, the connector 400 abuts against the sensing end of the switch 520, causing the switch 520 to control the first auxiliary lighting element 510 to be turned on.

The light emitted by the first auxiliary lighting element 510 and the above three light-and-shadow patterns are matched, so that the flowing light-and-shadow pattern can be presented on the surface of the multi-layer housing 300 to form the colored glaze of the small night lamp.

It should be noted that when the above seven light atmosphere modes are switched, the first auxiliary lighting element 510 can be set to continuously flash, so as to diversify the light-and-shadow patterns.

It should also be noted that in the above seven light atmosphere modes, the sound system 800 can be turned on or off to enhance the user experience.

As shown in FIGS. 10A, 10B, 11A and 11B, in some embodiments, the starry sky aurora atmosphere light with the integrated lampshade further includes a control console 900.

The control console 900 is arranged below the base 100, and a surface of the control console 900 has a button 910 for allowing the starry sky aurora atmosphere lamp with an integrated lampshade to enter the first light atmosphere mode, the second light atmosphere mode, the third light atmosphere mode, the fourth light atmosphere mode, the fifth light atmosphere mode, the sixth light atmosphere mode, and the seventh light atmosphere mode, respectively.

In summary, the present application can achieve at least the following beneficial technical effects.

1. On one hand, by selecting whether the multi-layer housing 300 covers the base, the starry sky aurora atmosphere lamp with an integrated lampshade can emit the lighting effect with appropriate atmosphere according to changes in usage scenarios and environment. On the other hand, the inner light-gathering cover 310 centers the pattern of the colored glaze of the small night lamp formed on the surface of the semi-obscuring outer cover 320, thereby improving the viewing angle and aesthetic appeal. The semi-obscuring outer cover 320 reduces the intensity of the transmitted light, making the small night light of colored glaze softer and preventing the light from projecting onto the building, yet still providing decoration and illumination for the surrounding environment.

2. Using only one drive element 700 as the power source for driving the first gear set 710 and the second gear set 720, improves the space utilization of the base 100. Furthermore, the first light effect adjustment plate 71*a*, the second light effect adjustment plate 72*a*, and the third light effect adjustment plate 72*b* rotate synchronously under the drive of the drive element 700, so that the light emitted by the main light source 200 passes through the wavy groove a on the first light effect adjustment plate 71*a*, presenting the flowing light-and-shadow pattern of Milky Way; a portion of the light emitted by the second auxiliary light source 600 passes through several star-shaped slots b on the second light effect adjustment plate 72*a*, presenting the flickering light-and-shadow pattern of starry sky; another portion of the light emitted by the second auxiliary light source 600 passes through the crescent-shaped slot c on the third light effect adjustment plate 72*b*, presenting the flickering light-and-shadow pattern of crescent moon.

3. Using only one second auxiliary light source 600 as the light source improves the space utilization of the base 100 and also allows the light emitted by this source to present different effects.

4. The multi-layer housing 300 is rotatably arranged on the base 100 through the connector 400, ensuring that the multi-layer housing 300 is not completely separated from the base 100 during use. When the multi-layer housing 300 is opened by the maximum angle, the connector 400 abuts against the outer side wall of the base 100, so that the multi-layer housing 300 is spaced apart from the outer wall of the base 100, which can avoid the multi-layer housing 300 is broken due to direct collision between the multi-layer housing 300 and the base 100 when a force for opening the multi-layer housing 300 is too large.

5. When the multi-layer housing 300 is opened by the maximum angle, the first connecting section 411 can hook onto the stopper 131, which can make the position of the multi-layer housing 300 more stable. Furthermore, the maximum angle at which the multi-layer housing 300 is opened can be 140° to make the multi-layer housing 300 more aesthetically pleasing to the base 100.

The above are the preferred embodiments of the present application, which are not intended to limit the protection scope of the present application. Therefore, all equivalent changes made according to the structure, shape and principle of the present application should be covered within the protection scope of the present application.

LISTING OF REFERENCE SIGNS

100 Base;
110 Accommodating Space;
111 Magnet;
120 Installation Cover;
121 First Yielding Hole;
122 Second Hole;
130 Accommodating Cavity;
131 Stopper Part;
200 Main Light Source;
210 Cover Body;
300 Multi-Layer Housing;
310 Inner Light-gathering Cover;
311 Positioning Hole;
320 Semi-Shielding Outer Cover;
321 Positioning Post;
330 Accessing Opening;
340 Magnetic Iron Plate;
400 Connector;
410 First End;
411 First Connecting Section;
420 Second End;
421 Second Connecting Section;
500 First Auxiliary Light Source;
510 First Auxiliary Lighting Element;
520 Switch;
600 Second Auxiliary Light Source;
610 Light Source Element;
611 Light Source Holder;
61*a* Strip-Shaped Notch;
620 Beam Splitter;
621 First Reflective Cup;
630 Reflector;
631 Second Reflective Cup;
700 Drive Element;
710 First Gear Set;
711 First Shaft;
71*a* First Light Effect Adjustment Plate;
720 Second Gear Set;
721 Second Shaft;
72*a* Second Light Effect Adjustment Plate;
722 Third Shaft;
72*b* Third Light Effect Adjustment Plate;
800 Sound System;
900 Control Console;
910 Button;
a Wavy Groove;
b Star-Shaped Slot;
c Crescent-Shaped Slot.

What is claimed is:

1. A starry sky aurora atmosphere lamp with an integrated lampshade, comprising:
a base;
a main light source arranged at a center of the base and configured to project light upwards to form a starry sky atmosphere light;
a multi-layer housing configured to cover the base, such that the main light source is located within an accommodating space formed between the base and the multi-layer housing, wherein the multi-layer housing comprises an inner light-gathering cover and a semi-obscuring outer cover covering a surface of the inner light-gathering cover; and
a connector for connecting the base with the multi-layer housing, wherein the connector is configured such that, when the multi-layer housing is rotated to cover the base, the multi-layer housing and the base have an integral and continuous appearance, while triggering an automatic transition of a light of the starry sky aurora atmosphere lamp into a night lamp light with dynamically changed colored glaze flowing light.

2. The starry sky aurora atmosphere lamp with an integrated lampshade according to claim 1, wherein a first auxiliary light source is further arranged in the base at a first side of the main light source, and the first auxiliary light source is configured to be turned on when the main light source is turned off and turned off when the main light source is turned on.

3. The starry sky aurora atmosphere lamp with an integrated lampshade according to claim 2, wherein the first auxiliary light source comprises a first auxiliary lighting element arranged on a circuit board and a switch for controlling the first auxiliary lighting element to be turned on or turned off, the connector is configured to abut against the switch to turn on the switch when the multi-layer housing covers the base, and the connector is configured to move away from the switch to turn off the switch when the multi-layer housing is opened by a maximum angle.

4. The starry sky aurora atmosphere lamp with an integrated lampshade according to claim 1, wherein a second auxiliary light source is further arranged in the base at a second side of the main light source, and the second auxiliary light source is configured to project a movable point light source or line light source onto the multi-layer housing.

5. The starry sky aurora atmosphere lamp with an integrated lampshade according to claim 4, wherein the starry sky aurora atmosphere lamp further comprises a drive element configured to control the second auxiliary light source to project the movable point light source or the line light source onto the multi-layer housing.

6. The starry sky aurora atmosphere lamp with an integrated lampshade according to claim 5, further comprising:

a first gear set dynamically coupled with the drive element, and the first gear set provided with a first shaft arranged on the first gear set; and a second gear set meshing with the first gear set, the second gear set provided with a second shaft arranged on the second gear set, wherein a second light effect adjustment plate is arranged on the second shaft, and the second light effect adjustment plate is configured for adjusting a light output of the second auxiliary light source.

7. The starry sky aurora atmosphere lamp with an integrated lampshade according to claim 6, wherein the second gear set is defined with a third shaft parallel to the second shaft, a third light effect adjustment plate is arranged on the third shaft, the second auxiliary light source comprises a light source element, a beam splitter located in a light output direction of the light source element, a reflector arranged parallel to the beam splitter, a first reflective cup arranged corresponding to the beam splitter, and a second reflective cup arranged corresponding to the reflector, the second light effect adjustment plate corresponds in position to the first reflective cup, and the third light effect adjustment plate corresponds in position to the second reflective cup.

8. The starry sky aurora atmosphere lamp with an integrated lampshade according to claim 4, wherein the starry sky aurora atmosphere lamp further comprises a drive element configured to control the second auxiliary light source to project the movable point light source or the line light source onto the multi-layer housing, and the drive element is further configured to control a light output of the main light source.

9. The starry sky aurora atmosphere lamp with an integrated lampshade according to claim 8, further comprising:

a first gear set dynamically coupled with the drive element, the first gear set provided with a first shaft arranged on the first gear set, wherein a first light effect adjustment plate is arranged on the first shaft, and the first light effect adjustment plate is configured for adjusting the light output of the main light source; and a second gear set meshing with the first gear set, the second gear set provided with a second shaft arranged on the second gear set, wherein a second light effect adjustment plate is arranged on the second shaft, and the second light effect adjustment plate is configured for adjusting a light output of the second auxiliary light source.

10. The starry sky aurora atmosphere lamp with an integrated lampshade according to claim 9, wherein the second gear set is defined with a third shaft parallel to the second shaft, a third light effect adjustment plate is arranged on the third shaft, the second auxiliary light source comprises a light source element, a beam splitter located in a light output direction of the light source element, a reflector arranged parallel to the beam splitter, a first reflective cup arranged corresponding to the beam splitter, and a second reflective cup arranged corresponding to the reflector, the second light effect adjustment plate corresponds in position to the first reflective cup, and the third light effect adjustment plate corresponds in position to the second reflective cup.

11. The starry sky aurora atmosphere lamp with an integrated lampshade according to claim 1, wherein the connector has a first end rotatably connected to the base and a second end fixed to the multi-layer housing, and the connector is configured such that:

when the multi-layer housing covers the base, the connector is configured to be accommodated in the base; and when the multi-layer housing is opened by a maximum angle, one end of the multi-layer housing fixed with the connector is configured to be spaced apart from an outer wall of the base.

12. The starry sky aurora atmosphere lamp with an integrated lampshade according to claim 11, wherein a material of the connector is plastic or silicone.

13. The starry sky aurora atmosphere lamp with an integrated lampshade according to claim 11, wherein the connector comprises a first connecting section and a second connecting section located between the first end and the second end, the first connecting section and the second connecting section are connected to form a fishhook shape, and a stopper part is arranged on the base, configured such that:

when the multi-layer housing is opened by the maximum angle, the first connecting section is configured to hook the stopper part to position the second connecting section outside the base.

14. The starry sky aurora atmosphere lamp with an integrated lampshade according to claim 11, wherein an appearance of the starry sky aurora atmosphere lamp is one selected from a group consisting of: cube, cuboid, sphere, truncated cone, truncated pyramid, and ellipsoid.

15. The starry sky aurora atmosphere lamp with an integrated lampshade according to claim 11, wherein the inner light-gathering cover and the semi-obscuring outer cover are integrally formed with each other.

16. The starry sky aurora atmosphere lamp with an integrated lampshade according to claim 11, wherein the inner light-gathering cover and the semi-obscuring outer cover are detachably connected with each other.

* * * * *